UNITED STATES PATENT OFFICE.

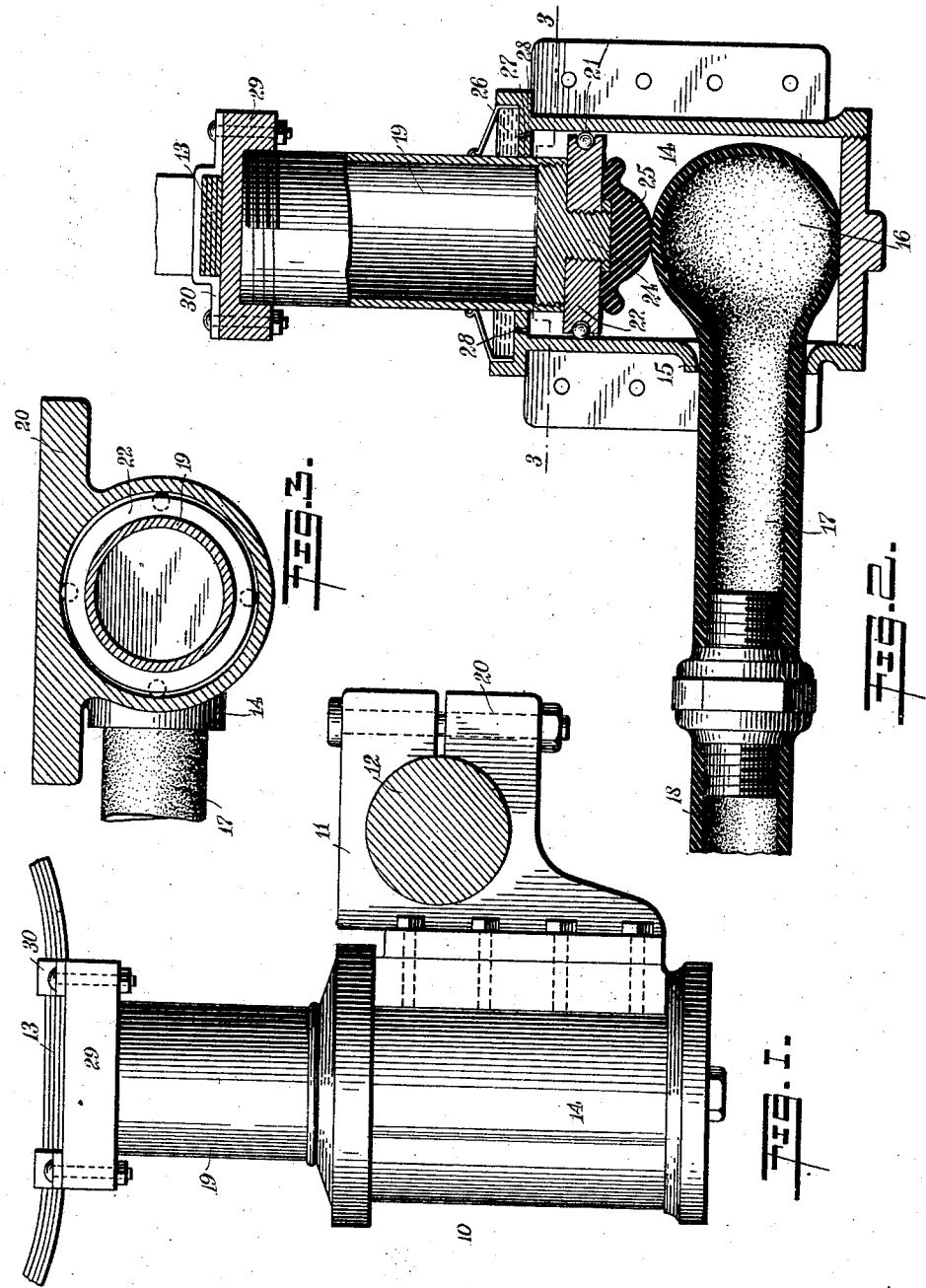

CARLOS ESCALANTE AND JOSÉ PATRICIO SIRGADO, OF MÉRIDA, MEXICO.

VEHICLE-SPRING.

986,969.  Specification of Letters Patent.  Patented Mar. 14, 1911.

Application filed January 6, 1910.  Serial No. 536,623.

*To all whom it may concern:*

Be it known that we, CARLOS ESCALANTE and JOSÉ PATRICIO SIRGADO, citizens, respectively, of the Republic of Mexico and of the Republic of Cuba, both residing at Mérida, in the State of Yucatan, Mexico, have invented a new and Improved Vehicle-Spring, of which the following is a full, clear, and exact description.

An object of the invention is to provide a pneumatic spring for connection with the axle of a vehicle, to provide the same flexibility as pneumatic tires; to secure the same on vehicles having solid tires so that the said vehicles will be free from any jars or shocks and to reduce the friction of the wheels of the vehicles with the pavement. To attain these objects we provide a chamber having disposed therein, a pneumatic cushion adapted to be connected with an air supply, a piston mounted to slide in the chamber and a bumper on the piston and adapted to normally engage the said cushion.

Reference is to be had to the accompanying drawings, forming a part of this specification, in which similar characters of reference denote corresponding parts in all the views, and in which—

Figure 1 is a side elevation of our invention; Fig. 2 is a sectional front view; and Fig. 3 is a sectional plan view taken on the line 3—3 of Fig. 2.

Referring more particularly to the figures, we provide a pneumatic spring 10 secured by a hanger 11 to an axle 12 and connected with a vehicle spring 13. The pneumatic spring comprises a chamber 14 having an opening 15 therein and disposed in the chamber is a pneumatic cushion 16 consisting of a rubber receptacle filled with air and having a neck 17 extended through the opening 15 and connected with a suitable pipe 18 leading to an air supply. A piston 19 is adapted to slide in the chamber 14 and in order to facilitate the movement of the piston and minimize friction, a ball bearing is provided, the balls 21 thereof being held in place by a circular plate 22 screw-threadedly secured to an extension 24 on the piston 19 and secured to the said extension, adjacent the plate 22 is a semi-ball shaped bumper 25 adapted to normally engage the cushion 16. The upper end of the piston 19 has screw-threadedly secured thereon, a plate 29 provided with an auxiliary plate 30 and the vehicle spring 13 is secured intermediate the plates 29 and 30.

As will be easily seen, any shock or jar contracted by the vehicle will be transmitted by the spring 13 to the piston 19 and the said shock will be absorbed by the pneumatic cushion 16. An air supply at a standard pressure can be at all times connected with the cushion and thus the cushion will retain its pneumatic and shock absorbing qualities.

Having thus described our invention, we claim as new and desire to secure by Letters Patent:

A device of the class described, comprising a chamber, a flexible pneumatic cushion in the chamber and adapted for connection with an air supply, a piston mounted to slide in the chamber, a bumper on the piston and adapted to engage the said cushion, an oil cup integrally formed on the chamber and encircling the said piston, guides inclined upwardly from the oil cup to engage the piston and guide the same, and apertured guides integrally formed on the oil cup to guide the piston, the said apertures being adapted to permit the flow of oil from the oil cup for lubricating purposes.

Mérida, Yucatan, Mexico, December 10th, 1909.

CARLOS ESCALANTE.
JOSÉ PATRICIO SIRGADO.

Witnesses:
JOSE M. GUERRA,
ANDRES FERNANDEZ MONTILLO.